United States Patent [19]

Hinton et al.

[11] 4,273,989

[45] Jun. 16, 1981

[54] BATTERY POWERED THERMAL GARMENT WITH FAST AND EFFICENT RECHARGING CIRCUIT

[76] Inventors: David O. Hinton, 4700 Hiddenbrook Dr., Raleigh, N.C. 27609; Jean G. French, 1045 Huntingdon Ct., Stone Mountain, Ga. 30083

[21] Appl. No.: 164,825

[22] Filed: Jun. 30, 1980

[51] Int. Cl.³ .............................................. H05B 1/02
[52] U.S. Cl. .................................. 219/211; 219/212; 219/268; 219/487; 219/501; 219/527; 219/507; 219/529; 128/402; 320/2
[58] Field of Search ............... 219/201, 211, 212, 268, 219/486, 487, 494, 501, 507, 528, 527, 529, 545, 549; 320/2; 126/204, 374; 128/399, 379, 402, 404; 338/410

[56] References Cited

U.S. PATENT DOCUMENTS

| 3,079,486 | 2/1963 | Winchell | 219/211 |
|---|---|---|---|
| 3,084,241 | 4/1963 | Carrona | 219/211 |
| 3,363,087 | 1/1968 | Buxbaum | 219/201 |
| 3,710,075 | 1/1973 | Tablonowski | 219/211 |
| 3,783,240 | 1/1973 | Drummond, Jr. | 219/486 |
| 3,858,028 | 12/1974 | Kerr | 219/211 |
| 4,031,352 | 6/1977 | Oosterberg | 219/212 |
| 4,042,802 | 8/1977 | Bickford | 219/211 |
| 4,205,223 | 5/1980 | Cole | 219/501 |

*Primary Examiner*—Volodymyr Y. Mayewsky
*Attorney, Agent, or Firm*—Mills & Coats

[57] ABSTRACT

The present invention relates to a battery powered thermal garment that is provided with a battery recharging circuit that is designed to recharge a battery package associated with said thermal garment approximately 30-40 times as fast as conventional recharging devices. In addition, the recharging circuit of the present invention is provided with a separate and direct power source for energizing the heating elements within said garment independently of said battery package. With respect to the recharging circuit, a transformer is provided for stepping down a AC voltage source and the transformer includes a dual tap, one for providing the independent power source to the garment and the other providing a recharging current. The recharging current is rectified and then directed through a silicon control rectifier to the battery package for recharging. The recharging circuit is designed to cease charging in response to the battery package having a certain level of charge or where the temperature within the battery package exceeds a selected temperature.

4 Claims, 4 Drawing Figures

BATTERY POWERED THERMAL GARMENT WITH FAST AND EFFICENT RECHARGING CIRCUIT

FIELD OF INVENTION

The present invention relates to thermal garments of the type provided with heating element means therein for heating the body of an individual wearing the garment. More particularly, the present invention entails a battery powered thermal garment and a fast recharging circuit for recharging a battery package utilized by the garment.

BACKGROUND OF INVENTION

Thermal garments of all types are known. For example, see the disclosures in U.S. Pat. Nos. 3,084,241; 3,427,431; 3,858,028; 3,519,791; 3,400,254; 2,277,772; 2,342,744; 2,458,119; 3,443,066; 3,955,063; 3,781,514; 3,783,240; 3,768,156; 3,751,620; 3,524,965; 3,729,613; 3,663,797; 3,657,515; 3,644,705; 3,663,796; 3,999,037; 3,989,924; 2,329,766; 1,358,509; 1,691,472; 2,579,383; 1,006,415 which show various types of thermal garments. From this, it is clear that thermal garments can be provided in the form of coats, shirts, underwear, shoes, gloves and even socks.

Thermal garments are normally provided with internal heating elements. A current directed to the heating element will cause the same to heat the garment and the body which the garment is disposed around.

In order to make thermal garments of this nature practical and useful, it has been necessary to utilize battery power in order that the garment can be worn away from a conventional AC power supply. This in itself has given rise to many drawbacks and disadvantages in thermal garments and has generally discouraged the wide use and acceptance of such. First, an appropriate battery package is often heavy and cumbersome and this is important since the user must carry such. Secondly, the battery package can be expensive and often the life of the package is relatively short. Finally, all such battery packages are not designed to be recharged and those that are designed to be recharged require a relatively long time period for recharging.

Consequently with these problems, thermal garments have not been readily accepted. This is especially disappointing today because thermal garments can be worn within a dwelling during winter and the dwelling thermostat can be set at a minimum while the occupants within are warm and comfortable. Thermal garments are a very efficient way of maintaining heating comfort for individuals because a very minimum area is being heated and the opportunity for heat loss is greatly minimized.

In this same regard, the utility of thermal garments for outdoor use, either while participating in recreation or at work, is obviously substantial.

SUMMARY OF INVENTION

The present invention relates to a thermal garment having heating element means incorporated therein and provided with a battery package for providing energy to the garment. In addition as a part of the present invention, there is provided a fast recharging circuit for selectively recharging said battery package approximately thirty times faster than conventional recharging. Also the same recharging circuit is provided with direct power means adapted to be connected to the thermal garment for supplying power thereto from an AC outlet completely independent of the battery package.

More particularly, the recharging circuit of the present invention is provided with outlet connecting means for directly connecting to a conventional AC wall outlet. The AC voltage from the wall outlet is directed to a transformer where the voltage is reduced. The transformer includes a secondary winding that has a dual tap, one tap serving as a direct power source to the thermal garment while the other tap serves to furnish a recharging circuit.

Rectifying means are provided within the battery recharging circuit for rectifying the recharging current after which the same is directed through a silicon control rectifier to a coupled battery package for recharging. Two important features of the recharging circuit entail a thermal switch that is operative to terminate recharging in response to the temperature of the battery package reaching a selected temperature. Secondly, there is provided a control circuit for sensing the level of charge of the battery package and terminating recharging current to the battery in response to the charging level reaching a certain level.

It is, therefore, an object of the present invention to provide a battery powered thermal garment with a fast and efficient recharging device that is capable of recharging a battery package in a very short period of time.

Still a further object of the present invention resides in the provision of a battery powered thermal garment provided with a recharging circuit that is designed to recharge the battery package approximately 30–40 times as fast as a conventional charging circuit.

Another object of the present invention resides in the provision of a battery powered thermal garment that is provided with a charge monitoring circuit that appraises or signals an existing low charge on the battery package, thereby warning of a need to recharge the battery package before the same ceases being able to furnish adequate power to the thermal garment, and generally preventing cell reversal.

Another object of the present invention is to provide a battery powered thermal garment and an associated recharging circuit of the character referred to above that is relatively safe in terms of controlling the temperature, pressure and excessive voltage of the battery package.

Still a further object of the present invention is to provide a practical, portable, and useful thermal body garment that is battery powered wherein the battery package has a relatively long life and can be quickly and easily recharged in a minimum amount of time.

Another object of the present invention resides in a battery powered thermal garment of the character referred to above that is provided with thermal switch means within the garment itself that prevents the supply of power to the garment when the temperature within the garment exceeds a selected temperature. This provides safety to the wearer and conserves the use of battery energy (i.e. allows more time between charges).

It is also a further object of the present invention to provide a battery charging circuit for a battery powered thermal garment that is specifically designed to supply a relatively large current load to the battery package for quick recharging.

Still a further object of the present invention resides in the provision of a battery powered thermal garment provided with a battery package that is relatively light and easy to handle, thereby giving rise to a thermal garment that has substantial portability especially for indoor mobility and outdoor use.

Other objects and advantages of the present invention will become apparent from a study of the following description and the accompanying drawings which are merely illustrative of the present invention.

BATTERY POWERED THERMAL GARMENT AND RECHARGING CIRCUIT THEREFOR

Figure 1:
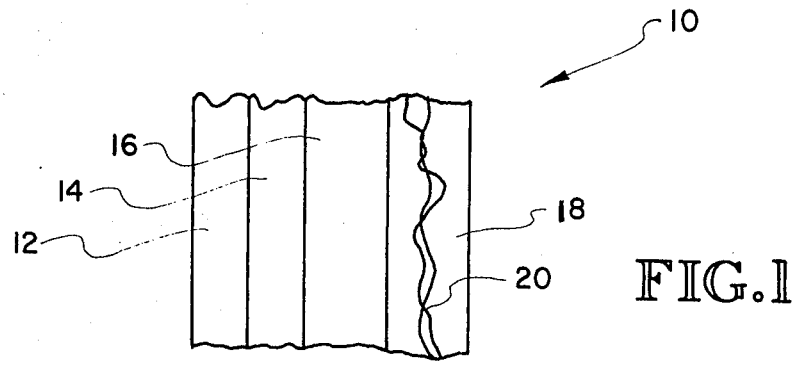
FIG. 1 is a fragmentary sectional view of a typical thermal garment.

With further reference to the drawings, the thermal garment is schematically illustrated in FIG. 1 and indicated generally by the numeral 10. Therein thermal garment 10 includes an outer fashion fabric 12, an adjoining millium layer 14 for reflecting heat, a layer of "thinsilate" 16 which serves as insulation and an inside lining 18 having a network of heating elements 20 disposed and wound therein. For a more complete and unified understanding of thermal garments, one is referred to the disclosures found in the above-referred to United States Patents.

Figure 4:
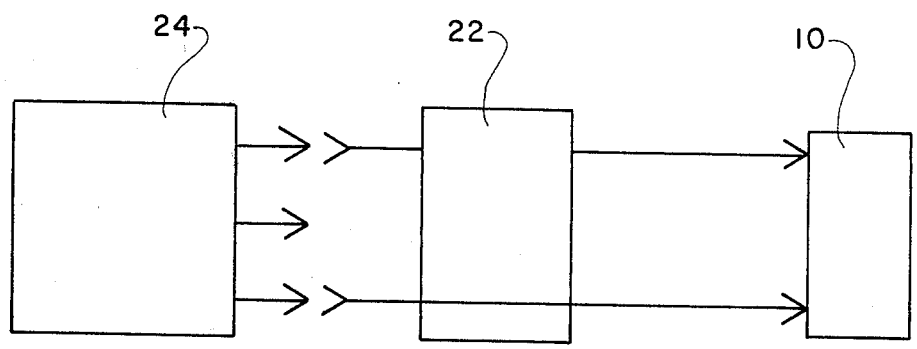
FIG. 4 is an electrical schematic of a thermostat circuit utilized in protecting the garment from high temperatures.

As a safety feature to prevent hyperthermia of the wearer, there is provided a thermal switch of circuit 22 that is operatively associated with the thermal garment 10 for sensing the temperature therein (FIG. 4). This thermal switch/circuit 22 is designed such that in the event the temperature of the thermal garment exceeds a certain temperature, the circuit is operative to terminate the delivery of power thereto.

The thermal garment 10 of the present invention is designed to be powered by a battery package indicated generally by the numeral 24. It is contemplated that a suitable type battery is the type produced by General Electric and referred to as "Power Up-15". Depending on the voltage desired and size/weight restrictions, any number of cells can be selected.

Figure 2:
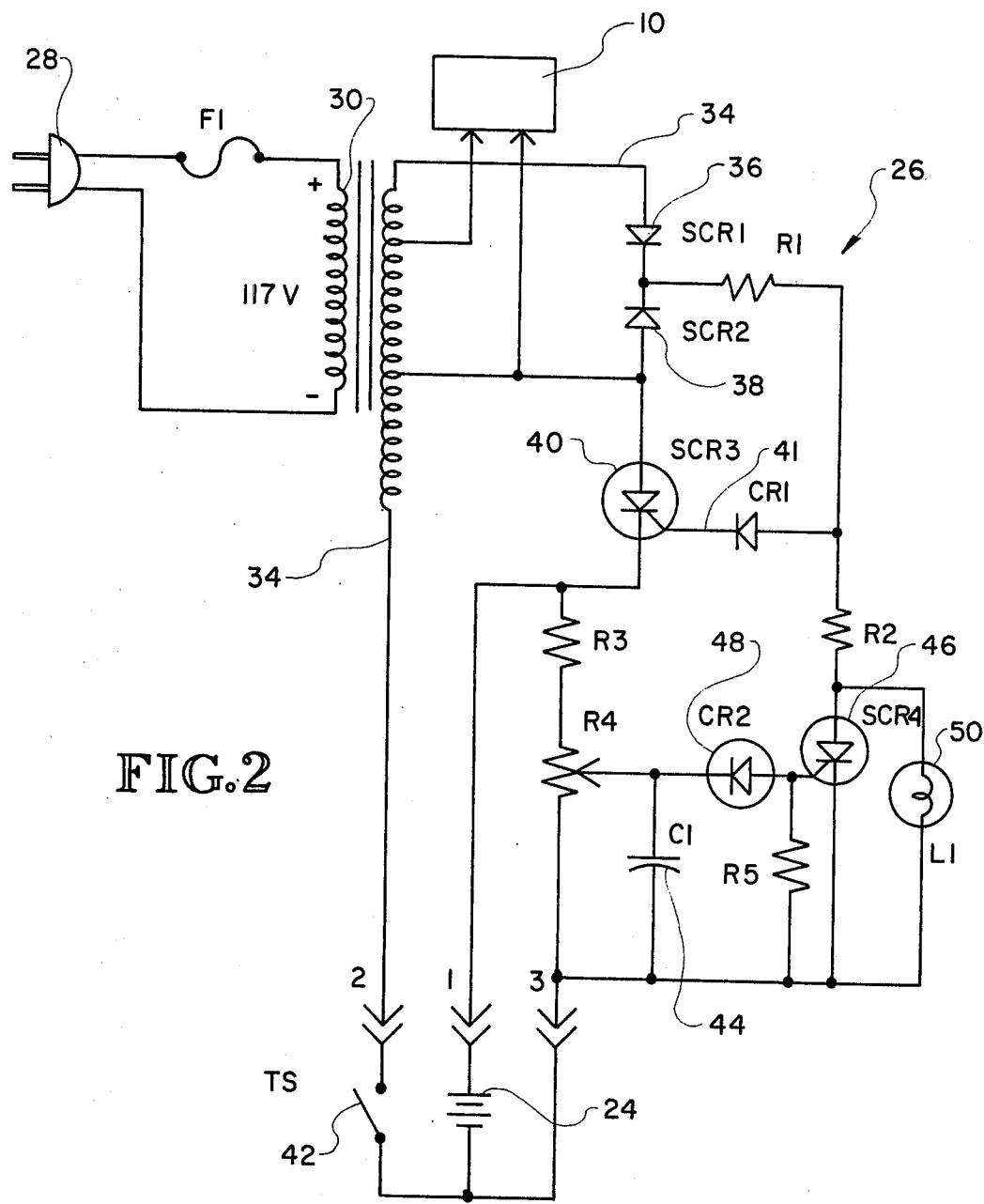
FIG. 2 is an electrical schematic diagram of the battery powered thermal garment and recharging circuit therefor.
Figure 3:
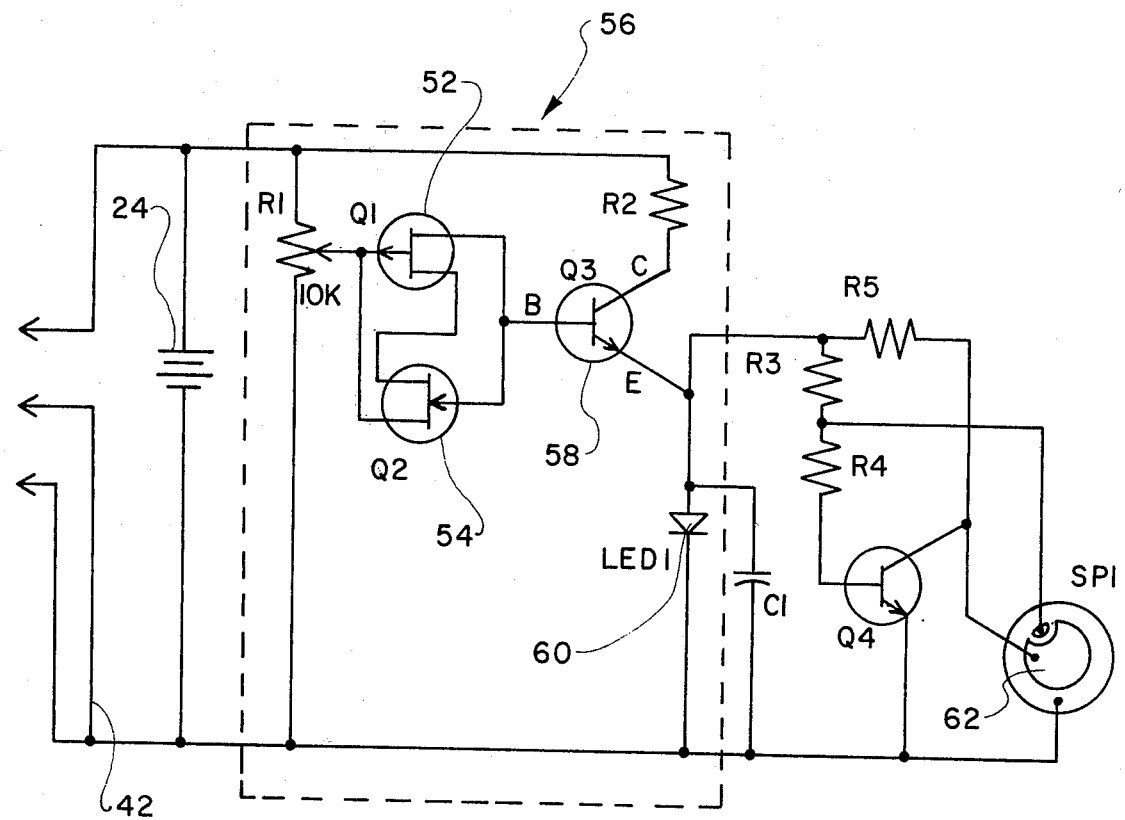
FIG. 3 is an electrical schematic of the battery monitoring circuit of the present invention.

Turning to FIG. 2, the recharging circuit of the present invention is shown therein and indicated generally by the numeral 26. Recharging circuit 26 includes an AC outlet plug-in 28 that is operatively connected to a transformer 30. By connecting plug-in 28 into a conventional AC outlet, an AC voltage is directed to transformer 30 and the same steps down the voltage to a selected value which in the case of the present disclosure is contemplated to be approximately 24 volts.

Transformer 30 includes secondary windings with a plurality of voltage taps extending therefrom. First, voltage tap 32 is directed from the secondary windings of transformer 30 and serves as a direct voltage source that can be plugged directly into the thermal garment 10 for supplying power to the same independently of battery package 24. The secondary windings of transformer 30 includes a second tap 34 and this second tap serves to generate a recharging current for charging battery package 24. Second tap 34 includes lines 34 leading from the secondary windings of the transformer and the recharging circuit is provided with a pair of diodes 36 and 38 that serve to rectify the output voltage of the recharging current. In particular the voltage is rectified such that it is generally a positive pulse voltage.

After rectification, the current is directed through a silicon control rectifier 40 and onto the battery package 24 for charging. It should be appreciated that silicon control rectifier 40 is actuated through line 41 which causes the same to receive a positive gate signal and, therefore, the silicon control rectifier 40 turns on during each cycle of the supply voltage.

To protect battery package 24 from excessive temperature, there is provided a thermal switch 42 that is operative to sense the temperature within the battery package. In the event the temperature of the battery package exceeds a selected temperature, thermal switch 42 is operative to open and consequently to terminate flow of charging current to the battery package.

Recharging circuit 26 is also designed to automatically cut off once the battery package 24 has been sufficiently charged. To accomplish this, the recharging circuit is provided with a capacitor circuit that includes a capacitor 44 and a silicon control rectifier 46 and a Zener diode 48. As long as the battery voltage is low or below a selected value, silicon control rectifier 40 is operative to receive a gate signal through resistor $R_1$ and diode CR. Thus silicon control rectifier 40 is able to turn on during each cycle of supply voltage and load current flows to charge the battery package 24. Once the battery voltage approaches a fully charged value, the voltage developed across capacitor 44 becomes sufficient to actuate silicon control rectifier 46 through Zener diode 48. At this point, the available voltage at the gate of silicon control rectifier 40 is dropped to a value below the battery terminal voltage due to the voltage divider action of $R_1$ and $R_2$. This means that silicon control rectifier 40 is unable to receive a positive gate signal and cannot conduct current. Thus the charging of the battery package 24 ceases.

As seen in FIG. 2, the recharging circuit includes a light 50 disposed in parallel with silicon control rectifier 46. This light is actuated once the charging is complete.

Turning to FIG. 2, there is shown a charge monitoring circuit indicated generally by the numeral 56. This circuit is designed to be operatively connected to the battery package 24 and to appraise or signal the presence of a low charge and the need for recharging.

In this regard, the charge monitoring circuit 56 includes a series of transistors 52, 54 and 58 which act to sense the voltage across battery package 24. Once the voltage across battery package 24 drops below a selected or preselected value, transistors 52 and 54 become active and bias transistor 58 which in turn actuates a light emitting diode 60 which serves to indicate the presence of a low charge and the need for recharging the battery package 24. In addition, as shown in the present disclosure, the charge monitoring circuit 56 is provided with an alarm 62 that is also actuated and this gives a more positive signal that can be perceived by an individual situated away from the battery package 24 or the associated charge monitoring circuit 56.

From the foregoing specification, it is appreciated that the present invention entails a battery powered thermal garment with a recharging circuit that is designed to quickly and efficiently recharge the battery package 24. Generally recharging can be accomplished in ten to fifteen minutes and through actual test it has been discovered that an eighty percent charge can be achieved between ten and eleven minutes. In addition, the recharging circuit 26 of the present invention has the advantage of having the capability for directly powering the thermal garment independently of the battery package 24. Consequently it is seen that the thermal body garment and associated recharging circuit of the present invention presents a very practical and useful portable body garment that can be battery powered. This is especially true inasmuch as the entire system is relatively simple and inexpensive and easy to maintain and use.

The present invention, of course, may be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A battery powered thermal garment and battery recharging circuit comprising: a thermal garment designed to be worn about the body of an individual and provided with heating element means disposed therein; and a power package for directing current to said thermal garment and powering the same including a battery package and a recharging circuit for recharging said battery package; said battery package being adapted to connect to said thermal garment and to selectively energize said heating element means therein; said recharging circuit being adapted to connect to said battery package for recharging the same and including means for connecting to an AC voltage source and directing the resulting AC voltage to said recharging circuit; transformer means for receiving said AC voltage and reducing the AC voltage to a selected secondary voltage; first tap means operatively associated with said transformer means and directed therefrom for directing a first current from said transformer means that can be directly coupled to said thermal garment for powering the same independently of said battery package; second tap means operatively associated with said transformer means and directed therefrom for generating a second recharging current within said recharging circuit; rectifying means for receiving said second recharging current and rectifying the same; switch means disposed within said recharging circuit and further operatively connected to said battery package for directing the recharging rectified current thereto for charging the same; means disposed within said recharging circuit for sensing the charge on said battery package and effectively controlling the flow of current through said switch means to said battery package in response to said battery package having a certain charge level; and thermal switch means operatively associated with said battery package for sensing the temperature of said battery package and terminating the flow of recharging current thereto in response to the temperature of said battery package being equal to or above a selected temperature.

2. The battery powered thermal garment and battery recharging circuit of claim 1 further including a battery charge monitoring circuit operatively connected with said battery package for monitoring the level of charge thereon; said battery charge monitoring circuit including means for sensing the level of charge of said battery package, and signaling means for signaling the presence of a low charge in response to said sensing means detecting a selected low charge level.

3. The battery powered thermal garment and battery recharging circuit of claim 2 wherein said garment includes thermal switch means operatively connected to said power package for effectively switching any connected power source off in response to the temperature within the thermal garment exceeding a selected temperature.

4. The battery powered thermal garment and recharging circuit therefor of claim 3 wherein said means for terminating the charge on said battery package includes a capacitor circuit operatively associated with said battery package and designed to be actuated upon said battery package reaching a certain level of charge; and means actuated by said capacitor circuit for lowering the actuating voltage directed to said silicon control rectifying means to a level that makes the same inoperative to conduct current therethrough and on into said battery package, consequently effectively switching the recharging current off.

* * * * *